United States Patent [19]

Seino et al.

[11] 4,443,745

[45] Apr. 17, 1984

[54] ROTATION SIGNAL DETECTION DEVICE OF DC MOTOR WITH BRUSHES

[75] Inventors: Akira Seino; Kazuo Takamori; Kaoru Morinaga, all of Yokohama, Japan

[73] Assignee: Tokyo Shibaura Denki Kabushiki Kaisha, Kawasaki, Japan

[21] Appl. No.: 300,480

[22] Filed: Sep. 9, 1981

[30] Foreign Application Priority Data

Sep. 12, 1980 [JP] Japan .................. 55-126753
Nov. 20, 1980 [JP] Japan .................. 55-163924

[51] Int. Cl.³ .................. G05B 5/00; H02H 7/08
[52] U.S. Cl. .................. 318/461; 318/264; 318/272; 318/277
[58] Field of Search .................. 318/6, 7, 618, 601, 318/326, 490, 456, 457, 458, 264, 272, 277, 278, 459, 461; 73/506; 324/160, 166, 168, 171, 180, 177; 361/23, 28, 31, 33

[56] References Cited

U.S. PATENT DOCUMENTS 3,346,725 10/1967 Allured et al. .................. 324/171 X
3,675,126 7/1972 Chilton .................. 324/168
3,732,477 5/1973 Cicatelli .................. 318/463

FOREIGN PATENT DOCUMENTS 2310739 9/1974 Fed. Rep. of Germany ...... 318/361
47-42573 12/1972 Japan .
53-166414 12/1978 Japan .................. 318/361

OTHER PUBLICATIONS

West, L. E., IBM Technical Disclosure Bulletin, vol. 10, No. 1, Jun. 1967, pp. 88–89, (Motor Control Circuit).

Primary Examiner—Ulysses Weldon
Attorney, Agent, or Firm—Cushman, Darby & Cushman

[57] ABSTRACT

Disclosed is a rotation signal detection device for use with a circuit for driving a DC motor with brushes, the device comprises a differential amplifier for detecting a pulse signal component of a waveform of the current supplied to the motor, a circuit for shaping an output of the differential amplifier, thereby actuating a logic circuit for controlling rotation of the motor by a DC level signal obtained from said shaped waveform.

3 Claims, 30 Drawing Figures

ROTATION SIGNAL DETECTION DEVICE OF DC MOTOR WITH BRUSHES

BACKGROUND OF THE INVENTION

The present invention relates to a rotation signal detection device of a DC motor with brushes which may be used for controlling a reel motor of a tape recorder or the like.

A magnetic tape of the tape recorder is wound around reels and these reels are driven by a reel motor, thus winding the magnetic tape from one reel to the other. When the magnetic tape accidentally becomes wound around a capstan or the like while the magnetic tape is traveling, smooth tape travel is prevented which causes cutting of the tape, reel motor troubles or the like. In this case, the power to the reel motor must be immediately stopped. The magnetic tape stops traveling when the tape is wound to the end. The reel motor must then be turned off or the motor rotation must be reversed. For these purposes, the rotation of the reel motor must be supervised and the driving circuit of the reel motor must be controlled in response to a rotating condition detecting signal. Further, tone quality of the sound reproduced by the tape recorder greatly depends on the tape traveling speed. If the rotation of the reel motor is unstable, the sound quality is degraded. In order to stabilize the tape traveling speed, a tension servo circuit has been used to control the rotation of the reel motor.

For controlling the reel motor rotation described above, the rotating condition of the reel motor must be detected. Conventionally, a combination of a magnet and a lead switch or a Hall element is utilized for detecting the rotating condition magnetically. Alternatively, a photocoupler is utilized for detecting the rotating condition photoelectrically.

These rotation detecting circuits, however, are supplementarily added to the tape recorder as a special detecting element, so the overall structure of the tape recorder becomes complex, thus adversely increasing the manufacturing cost.

SUMMARY OF THE INVENTION

The object of the present invention, therefore, is to provide a rotation signal detection device of a DC motor with brushes which is easily employed for an automatic stop device, a tension servo circuit or the like, wherein the rotating condition of the DC motor with brushes is easily detected without using an additional element.

According to the present invention, a rotation signal detection device of a DC motor with brushes is obtained in which a pulse signal component in current waveform which is generated when a brush is switched from one commutator segment to another is detected, and this detected output is fed back to a motor driving circuit section for controlling the rotation of the motor.

BRIEF DESCRIPTION OF THE DRAWINGS

FIG. 12a–FIG. 12h show signal waveforms of respective units of the circuit of FIG. 11.

DETAILED DESCRIPTION OF THE PREFERRED EMBODIMENTS

The operation principle of the present invention will be described when it is used for a tape recorder. According to the present invention, a DC motor with brushes, other than a capstan driving motor, for driving a supply reel and a take-up reel of a cassette tape recorder is conveniently utilized for forming a 2-motor direct coupling driving mechanism, while the reel driving motor drives a reel base and performs all modes of operations such as playback, fast forwarding and rewinding. The above DC motor with brushes is also used as the reel driving motor in the tape recorder mentioned above. When the motor shaft is locked (stopped) at the end of the tape travel, the current waveform at the locked position differs from that in rotation since the two ends of the tape are fixed to the respective reel hubs. By utilizing the difference in the current waveforms, the rotation signal of the reel motor can be detected.

Figure 1:
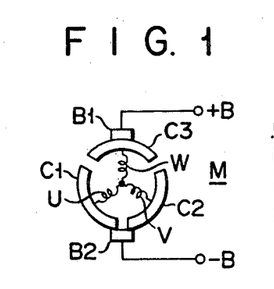
FIG. 1 is a view illustrating the schematic arrangement of a DC motor with brushes.

In general, the DC motor with brushes has commutator segments C1, C2, and C3 which are respectively connected to respective first ends of three driving windings U, V and W the second ends of which are commonly connected in a Y-shape (when the motor is three-phase) as shown in FIG. 1. When power is selectively supplied from DC power sources +B and −B through brushes B1 and B2 to the respective driving windings U, V and W through the commutator segments C1, C2 and C3, a rotating field is generated.

Figure 2A:
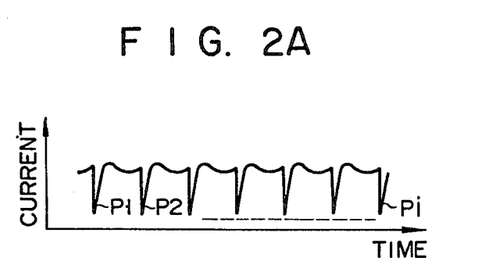
FIGS. 2A and 2B are views illustrating current waveforms of the motor shown in FIG. 1.
Figure 2B:
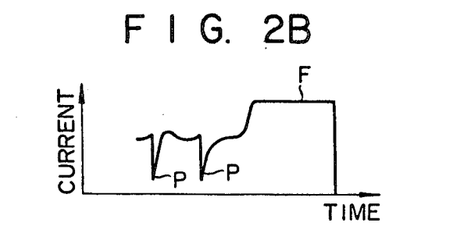

The current waveform at a motor M in rotation is shown in FIG. 2A. In the figure, pulse signal components P1, P2, ... are present in the waveform since these pulse signal components are generated in the interval when a brush is switched from one commutator segment to another (through the interval may vary according to the rotating speed). On the other hand, when the magnetic tape reaches its end, that is, when the motor is locked (stopped), the above-mentioned pulse signal components are not present in the current waveform as shown in FIG. 2B, but non-pulse signal component F is present in the current waveform. Therefore, if the pulse signal component is detected in the current waveform of the motor, a rotation signal detection circuit section employing it can be used as an automatic stop device of a tape recorder or the like.

In the current waveform mentioned above when the motor shaft is locked (stopped), the shape of the non-pulse signal component varies in the current waveform of the motor slightly according to the kind of motor. However, the pulse signal component in the current waveform when the motor rotates is constant, regardless of the kinds of motor. The pulse signal component depends on the number of poles of the motor, resulting in commutator noise or motor noise at a fixed frequency. For example, 6 pulses are generated per revolution in a three-pole motor.

One embodiment of a rotation signal detection circuit of a reel motor which can realize a rotation detecting section based on the principle mentioned above will be described with reference to the accompanying drawings.

Figure 3:
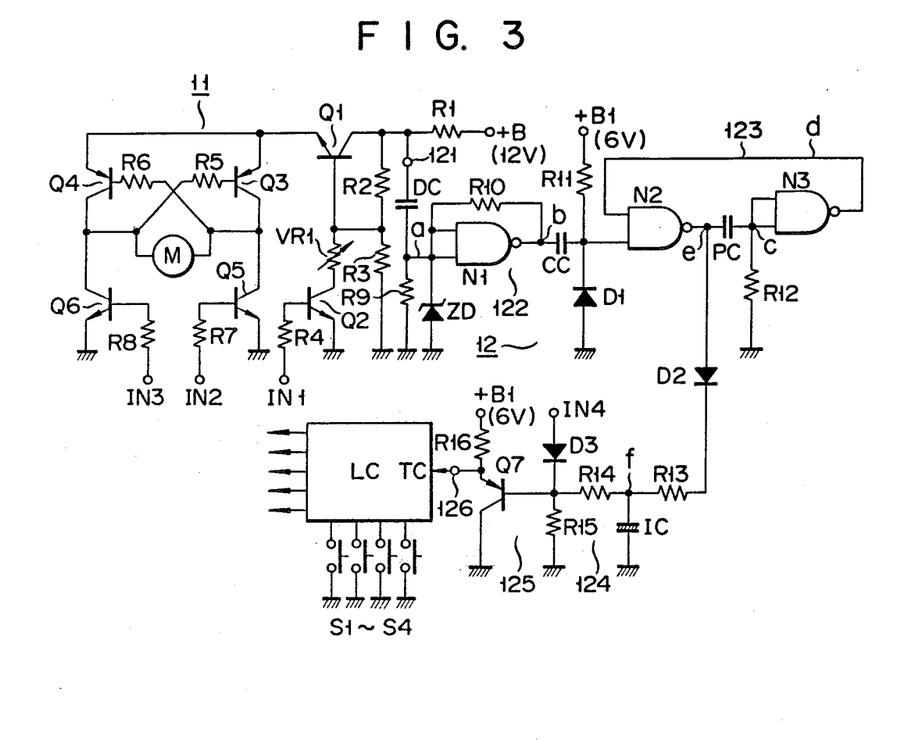
FIG. 3 is a circuit diagram of one embodiment according to the present invention.

Referring to FIG. 3, reference numeral 11 is a reel motor driving circuit section. Power source +B is connected to the collector of a transistor Q1 through a resistor R1 and is grounded further through series-connected resistors R2 and R3. The base of the transistor Q1 is connected to a node of the series-connected resistors R2 and R3, and to the collector of a transistor Q2 through a variable resistor VR1. The emitter of the transistor Q1 is connected to a common emitter of transistors Q3 and Q4. The base of the transistor Q2 is connected to a playback input terminal IN1 through a resistor R4. The emitter of the transistor Q2 is grounded. The base of the transistor Q3 is connected through a resistor R5, together with the collector of the transistor Q4, to the collector of a transistor Q6. Similarly, the base of the transistor Q4 is connected through a resistor R6, together with the collector of the transistor Q3, to the collector of a transistor Q5. The bases of the transistors Q5 and Q6 are respectively connected to a playback/fast forwarding input terminal IN2 and rewinding input terminal IN3 through respective resistors R7 and R8. The emitters of the transistors Q5 and Q6 are respectively grounded. A DC motor with brushes M is connected between the collectors of the transistors Q5 and Q6.

The resistor R1 is used for setting a motor torque in fast forwarding and rewinding modes, while the resistor R2 and the variable resistor VR1 are used for setting the motor torque in playback. The resistors R1 and R2, and the variable resistor VR1 are utilized for setting the motor driving voltage in the playback, fast forwarding and rewinding modes. Further, the resistors R2 and R3 are used for setting the time for the fast forwarding and rewinding.

Figure 4:
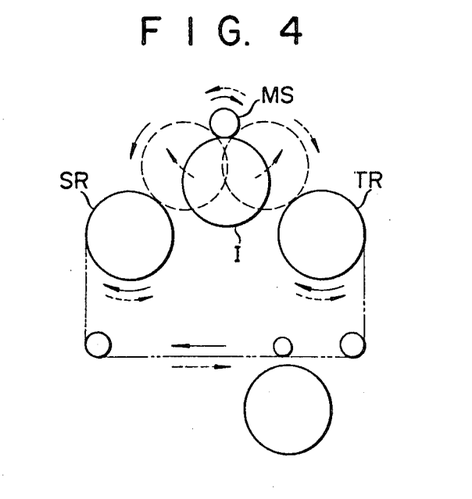
FIG. 4 is a view illustrating the arrangement of the reel motor shown in FIG. 3.
Figure 5A:
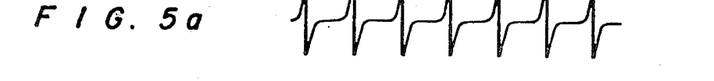
FIGS. 5(a) to 5(f) are views illustrating signal waveforms of respective units of the circuits of FIG. 3.
Figure 5B:
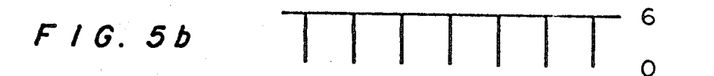
Figure 5C:
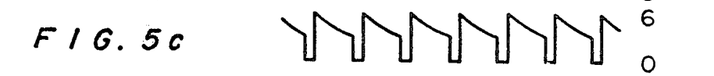
Figure 5D:
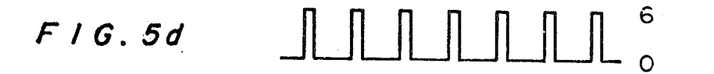
Figure 5E:
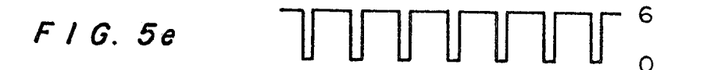
Figure 5F:
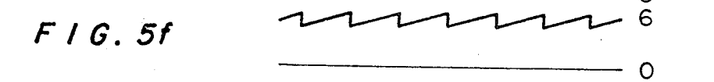

A motor shaft MS of the DC motor with brushes for driving the reels, for example as shown in FIG. 4, engages with an idler I which is selectively engaged or disengaged with a supply reel SR or a take-up reel TR. The arrangement of the motor shaft MS, the idler I and the respective reels may be such that they are coupled with gears and the idler I is selectively engaged with the supply reel SR or the take-up reel TR corresponding to the rotational direction of the motor shaft MS. Alternatively, the idler I may be switched over to one of the reels by a solenoid plunger or the like ganged with the corresponding operation key.

In this case, since the reels are driven by a reel motor for this purpose without using a slip mechanism such as a clutch, the reliability of the tape driving mechanism is increased, and the manufacturing cost is accordingly reduced.

The cassette tape recorder of this type differs from the tape recorder having a simple mechanical operation section, in that it has a logic (electronic) control section. Therefore, according to the logic circuits which correspond to the respective operation keys, for example, an operation signal of high level is selectively supplied to the input terminals IN1 to IN3 when the operation key is operated, while an operation signal of low level is selectively supplied to the input terminals IN1 to IN3 when the operation key is not operated.

An operation signal of high level is supplied to the input terminals IN1 and IN2 in the playback mode, so that the transistors Q2 and Q5 are turned on. The transistor Q1 is then weakly biased and the transistor Q4 is turned on. The power source (+B) voltage is supplied as a small voltage output to the motor M through the resistor R1 since a voltage route of Q1 and Q4, motor M, Q5 and ground is estabilished. The motor M makes the take-up reel travel in the forward direction, thus accomplishing constant speed playback.

For fast forwarding, an operation signal of high level is supplied only to the input terminal IN2, so that the transistor Q2 is turned off and the transistor Q5 is turned on. The transistor Q1 is then strongly biased and the transistor Q4 is turned on, so that a large voltage output is supplied to the motor along the voltage route described above. The motor M makes the take-up reel travel at high speed in the forward direction, thus accomplishing fast forwarding.

For rewinding, an operation signal of high level is supplied to only the input terminal IN3, so that the transistor Q2 is turned off and the transistor Q6 is turned on. The transistor Q1 is then strongly biased and the transistor Q3 is turned on, so that along a voltage route of Q1 and Q3, motor M, Q6 and ground, a large voltage output is supplied to the motor M. The motor makes the supply reel travel at high speed in the reverse direction, thus achieving rewinding.

As is apparent from the above description, the resistor R1 determines the amount of current supplied to the motor M, that is, the torque of the motor M (especially for fast forwarding and rewinding). Since the current waveform of the motor M in rotation includes the pulse signal components described above, the pulse signal components may be regarded as the voltage drop across the resistor R1.

According to this embodiment, in order to detect whether or not the reel rotates (that is, whether or not the pulse signal components are present in the current waveform) based on the voltage change across the resistor R1, the node of the resistor R1 and the collector of the transistor Q1 is connected to an input terminal 121 of a rotation control circuit section 12.

In this case, the input terminal 121 is grounded through a differential capacitor DC and a resistor R9 connected in series to constitute part of a differential amplifier 122. Two input terminals of a NAND circuit N1 which constitutes part of the differential amplifier 122 are commonly connected to a node of the capacitor DC and the resistor R9. A resistor R10 is connected between the output terminal and the two input terminals of the NAND circuit N1. A Zener diode ZD is connected between the two input terminals of the NAND circuit and ground.

The output terminal of the NAND circuit N1 which is, at the same time, the output terminal of the differential amplifier 122, is connected to one of the input terminals of a NAND circuit N2 which constitutes part of a monostable multivibrator 123, through a coupling capacitor CC. One of the input terminals of the NAND circuit N2 is grounded through a diode D1 with a polarity as shown in the figure. This input terminal of the NAND circuit N2 is also connected to a power source +B1 through a resistor R11 while the other input terminal is connected to an output terminal of a NAND circuit N3 which constitutes part of the monostable multivibrator 123. The two input terminals of the NAND circuit N3 are commonly connected to the output terminal of the NAND circuit N2 through a pulse width determining capacitor PC and are commonly grounded through a resistor R12.

The output terminal of the NAND circuit N2 which is the output terminal of the monostable multivibrator 123 is connected to one end of a resistor R13 which constitutes part of an integration circuit 124, through a diode D2 having a polarity as shown in the figure. The other end of the resistor R13 is grounded through an integration capacitor IC and is also connected to one end of a resistor R14.

The other end of the resistor R14 as the output terminal of the integration circuit 124 is connected to the base of a transistor Q7 which constitutes a switching (buffer) circuit 125. The base of the transistor Q7 is grounded through a resistor R15 and is also connected to a control signal input terminal IN4 through a diode D3 having a polarity as shown in the figure. The emitter of the transistor Q7 is connected to a resistor R16 through the power source +B1 and to an output terminal 126 of the rotation control circuit section 12. The collector of the transistor Q7 is grounded.

A logic circuit LC whose control terminal Tc is connected to the output terminal 126 supplies predetermined control signals to the input terminals IN1 to IN4, based on the respective operations such as playback, fast forwarding, rewinding and stop modes specified by respective operation keys S1 to S4. Further, the logic circuit supplies a control signal based on the output signal from the rotation control circuit section 12 in order to achieve an automatic stop operation or the like to be described later. No. TC-9121P manufactured by Tokyo Shibaura Denki K.K. may be employed for this logic circuit LC.

With the above construction, the rotation control circuit section 12 differentially amplifies a voltage applied to the input terminal 121 at the differential amplifier 122 in order to detect the pulse signal component (commutator noise or motor noise) in the current waveform of the motor M, which is given as a voltage change across the resistor R1 of the motor driving circuit section 11 as described before. The monostable multivibrator 123 is triggered by the output from the differential amplifier 122, thus yielding a rectangular wave output having a predetermined pulse width.

The rectangular wave output from the monostable multivibrator 123 is integrated at the integration circuit 124 and is output as a slightly higher or lower output of the substantially saw-toothed waveform. While the output of constant level is output from the integration circuit 124, that is, while the pulse signal component is present in the current waveform of the motor M which is rotating, the buffer circuit 125 stays off. When the motor M is locked at the tape end and the motor shaft stops rotating, the pulse signal component disappears from the current waveform. Then, the monostable multivibrator 123 stops outputting the signal and the output of constant level from the integration circuit 124 is gradually lowered and becomes zero. The buffer circuit is then turned on. The output from the buffer circuit 125 is supplied to the control terminal Tc of the logic circuit LC through the output terminal 126. The logic circuit IC operates its own control circuit to cancel the setting of the logic circuit in the previous operating mode even though the buffer circuit 125 outputs an on signal, and performs the automatic stop operation in which magnetic heads or the like are restored to the stop position by way of a solenoid or the like.

When the automatic stop operation is completed (same as in normal stop operation), a control signal of low level for playback is supplied from the logic circuit LC or the like to the control signal input terminal IN4, so that the buffer circuit 125 is compulsorily turned off, thus preventing erratic operations.

FIG. 5 shows waveforms of respective units described above, in which reference symbol (a) corresponds to an input waveform of the differential amplifier 122; (b), an output waveform thereof; (c), an input waveform of the NAND circuit N3 at the monostable multivibrator 123; (d), an output waveform thereof; (e), an output waveform of the monostable multivibrator 123; and (f), an output waveform of the integration circuit 124.

The period of the differential waveform of the pulse signal components (so-called motor noise) in the current waveform of the motor M is about 4 msec in the fast forwarding and rewinding modes at high speed driving, while the period is about 60 msec (beginning of tape travel) to about 140 msec (end of tape travel) during constant tape travel. Therefore, the output period of the monostable multivibrator 123 is, in general, set to about 100 msec which corresponds to the maximum period of the motor noise. Their duty ratio is preferably not more than 1:1.

In practice, the periodic component of motor noise has a longer period at the tape end than the normal period of the motor noise. Further, if trouble occurs (for example, the tape accidentally becomes wound around the capstan or the like), the period of the motor noise becomes longer than the normal period. When this occurs, the motor still rotates with an overload while the reels completely stop rotating. In this way, the driving operation is continued, and the rotating speed is abruptly reduced. Therefore, the period of the motor noise (rotation pulse interval) is made longer than the normal period.

When this erratic operation occurs, the automatic stop operation must be initiated. However, the rotation control circuit section 12 does not detect the trouble described above, thus disabling the automatic stop operation and resulting in an undesirable outcome.

Figures 6, 10:
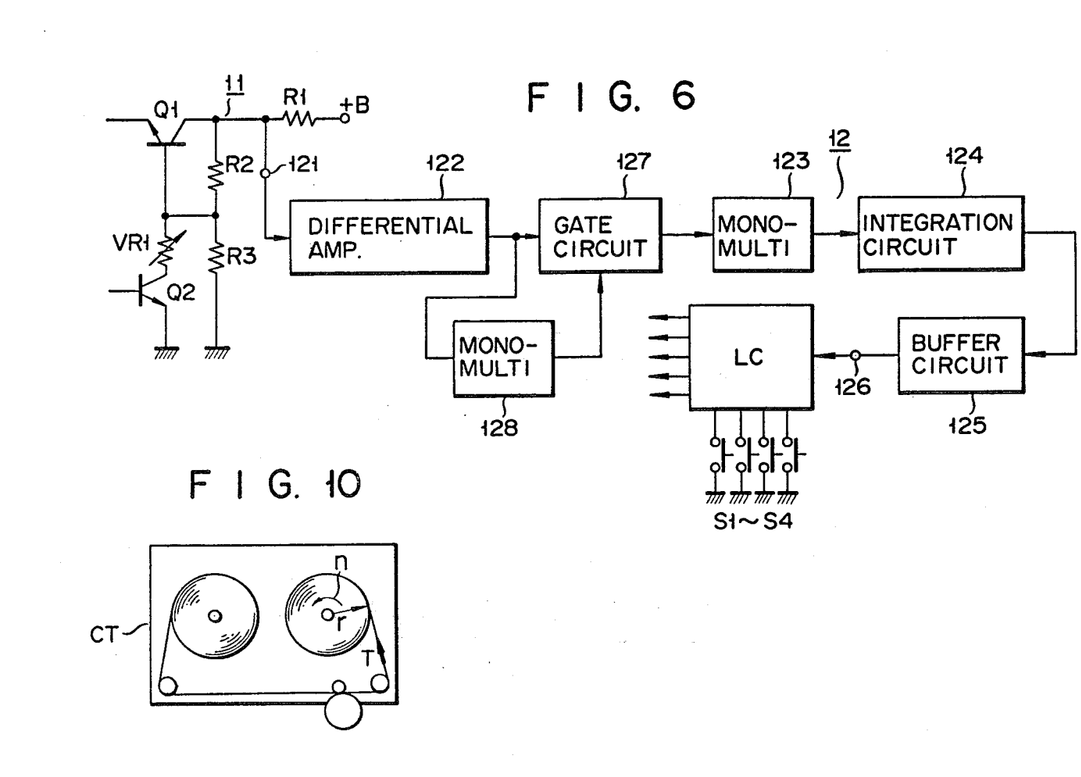
FIG. 6 is a block diagram of another embodiment according to the present invention.
FIG. 10 is a view illustrating the operation principle of a tension servo circuit when a tape is traveling on the tape recorder.

Referring to FIG. 6, a gate circuit 127 is inserted between the differential amplifier 122 and the monostable multivibrator 123 of the rotation control circuit section 12 shown in FIG. 3 in order to eliminate the problem described above. Further, a monostable multivibrator 128 is added to the rotation control circuit section 12, as shown in FIG. 6. The monostable multivibrator 128 is triggered by the output of the differential amplifier 122. The output period of the monostable multivibrator 128 is set at about one and one-half times the normal period of the motor noise (rotation pulse).

Figure 7A:
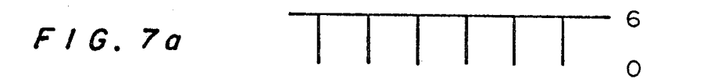
FIGS. 7(a) to (f) are views illustrating signal waveforms of respective units of FIG. 6.
Figure 7B:
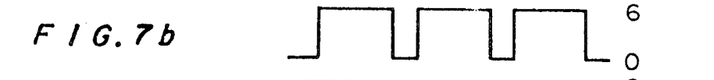
Figure 7C:
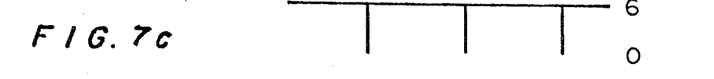

With the construction described above, at a usual time, as shown in FIG. 7(a), the gate pulse period of the gate circuit 127 is set at about one and one-half times the period of the motor noise (rotation pulse) by the output of the monostable multivibrator 128 which has as output waveform as shown in FIG. 7(b) and which is triggered by the output of the differential amplifier 122. The output waveform of the differential amplifier 122 is shown by (a) in the figure. Rotation pulses received during the presence of the gate pulse component pass through the gate; the waveform of the passed rotation pulses is shown in FIG. 7(c). The rotation control circuit section 12, based on this rotation pulse, detects the rotation of the motor since the rotation pulse is present in the detected waveform.

Figure 7D:
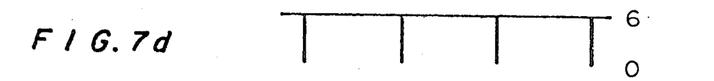
Figure 7E:
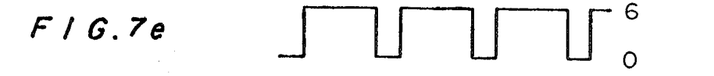
Figure 7F:
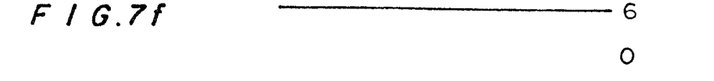

Suppose that the rotation pulse period is made long as shown in FIG. 7(d) when the magnetic tape is wound to the end or when trouble occurs such that the tape is wound around the capstan or the like. Since the gate period of the gate circuit 127 is set at about one and one-half times the usual period of the motor noise, as shown in FIG. 7(e), the rotation pulses cannot pass through the gate, as shown in FIG. 7(f). Therefore, the rotation control circuit section 12 cannot detect the rotation pulse since it is not present in the waveform, thus accomplishing the automatic stop operation described before.

The rotation pulse period is made longer than usual and the detection is performed whether or not the rotation pulse is present. Thus, the automatic stop operation can be accomplished at the end of the tape and in the case in which trouble occurs during travel, thereby preventing undesirable and erratic operations.

A tape travel display section 13, a digital (tape) counter section 14 and a composite operation switching section 15, which are connected to the rotation control circuit 12 described above, will be described.

Figure 8:
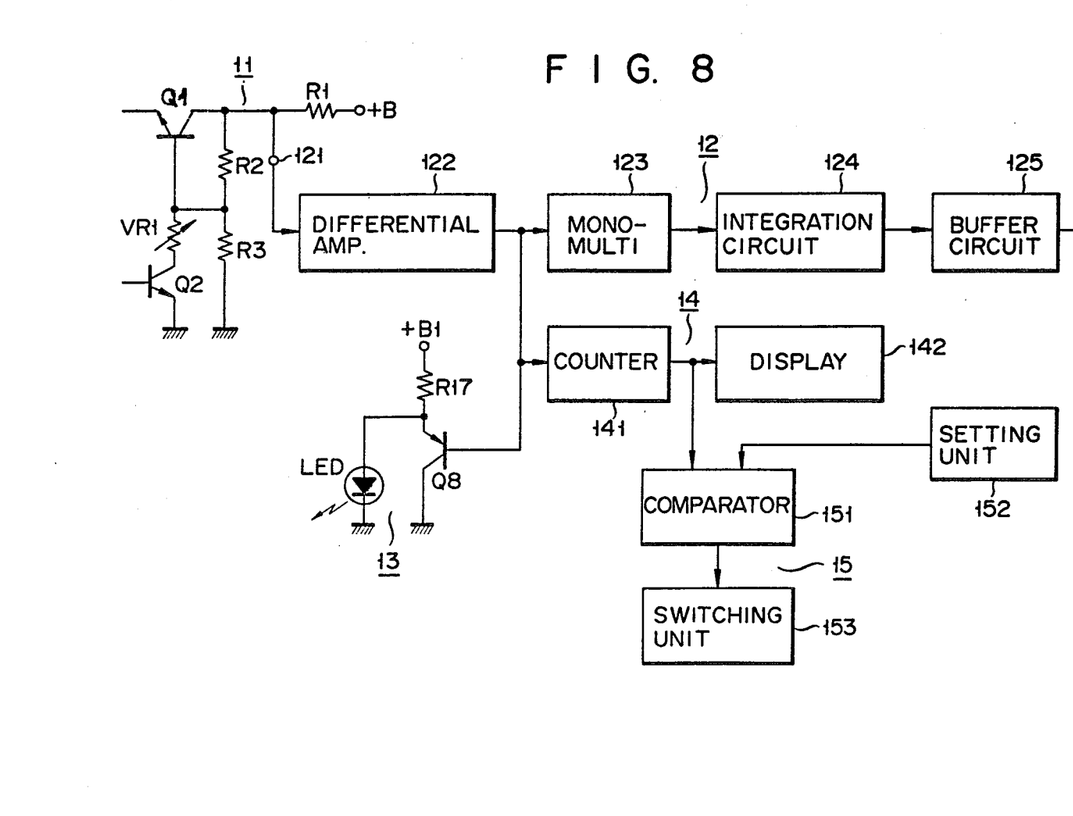
FIG. 8 is a block diagram illustrating main units of a tape traveling display section, a digital tape counter section, and a composite operation switching section which are connected in the circuit shown in FIG. 3.

As shown in FIG. 8, an output of the differential amplifier 122 which is included in the rotation control circuit section 12 is utilized, the rotation control circuit section 12 comprising the input terminal 121 connected to the motor driving circuit section 11 shown in FIG. 3, the differential amplifier 122, the monostable multivibrator 123, the integration circuit 124, the buffer circuit 125 and the output terminal 126. The tape travel display section 13 has an arrangement in which the base of a switching transistor Q8 is connected to the output terminal of the differential amplifier 122, the collector of the transistor Q8 is grounded, and the emitter of the transistor Q8 is connected to the power source +B1 through a resistor R17 and is grounded through a light-emitting diode LED as a display element having a polarity as shown in the figure.

In the tape travel display section 13 having the arrangement described above, the switching transistor Q8 is switched, based on the output (refer to (b) of FIG. 5) of the differential amplifier 122, to flash the light-emitting diode LED. The flashing of the diode indicates that the tape is traveling. When power is down from the motor M, the differential amplifier 122 does not output the signal, thus turning off the light-emitting diode LED.

The digital counter section 14 has an arrangement in which a digital counter 141 is connected to the output terminal of the differential amplifier 122 and a digital display 142 is connected to the output terminal of the digital counter 141.

With this construction, the counter 141 of the digital counter section 14 counts the output pulses of the differential amplifier 122 and the counted output is displayed at the digital display 142. The period of motor noise (rotation pulse) is measured as the traveling length of the tape which is, in turn displayed, at the display. A monostable multivibrator or a frequency divider may be inserted at the input terminal of the counter 141 as needed.

The composite operation switching section 15 has an arrangement in which one of the input terminals of a comparator 151 is connected to the output terminal of the counter 141 of the digital counter section 14, and other input terminal of the comparator 151 is connected to a setting unit 152. The output terminal of the comparator 151 is connected to the input terminal of a switching unit 153 whose output terminal is connected to an automatic repeating circuit or an automatic reversing circuit (not shown; may be included in the logic circuit LC shown in FIG. 3).

When the composite operation switching section 15 has the arrangement described above, the setting unit 152 sets the tape position setting data which converts one operation (e.g., playback) to another operation (e.g., rewinding), (an arbitrary tape position is determined in the range of 000 to 999, for example, 999 determined as the end position of the tape, so that automatic repeating and automatic reversing may be conveniently performed, including partial repeating and partial reversing). The comparator 151 then compares the tape position setting data and the output of the counter 141 in order to convert the tape position to digital data. When the tape position setting data and the output of the counter 141 correspond with each other, the switching output is supplied to the switching unit 153 to switch the current operation of the tape recorder to the desired operation.

The switching unit 153 provides a switching control operation such that the logic circuit LC supplies a predetermined control signal to the input terminals IN1 to IN3 of the motor driving circuit section 11.

Figure 9:
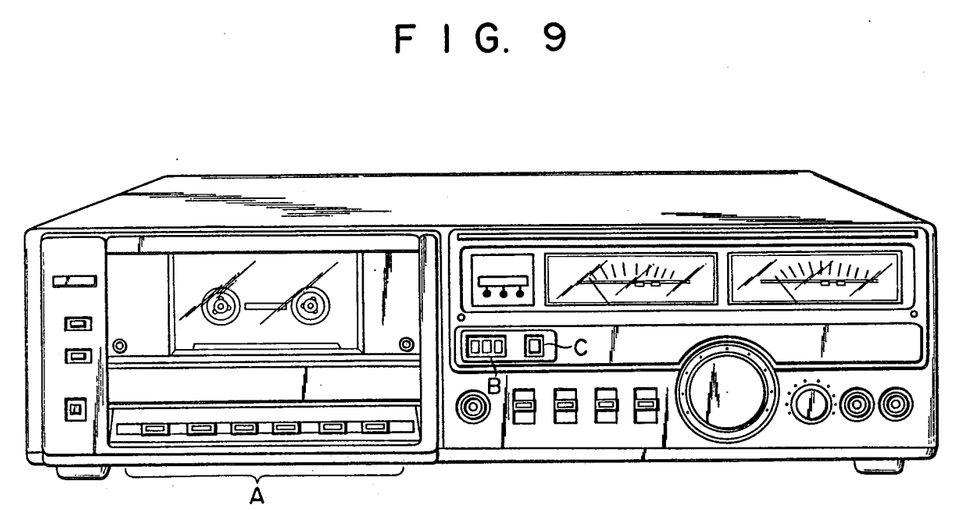
FIG. 9 is a perspective view illustrating the outer appearance of a cassette tape deck incorporating circuits of FIGS. 3 and 8.

FIG. 9 is a perspective view illustrating the outer appearance of a cassette tape deck incorporating the respective circuits described above. In the figure, reference symbol A denotes a logic operation key section; B, a digital counter; and C, a tape travel display.

According to the embodiment described above, an extremely practical rotation signal detection circuit for controlling reel motor rotation is provided with an arrangement in which the rotation pulse from a DC motor with brushes for driving reels is directly detected: the rotating condition of the reel is easily detected without adding a special element for detection, and simple construction can easily be employed for an automatic stop device of the tape recorder or the like, thus reducing the manufacturing cost.

In the above embodiment, automatic stoppage can be achieved by detecting the locked condition of the DC motor with brushes. Further, the motor rotation can be stabilized by detecting changes in the intervals between the pulse signal components of the motor noise of the DC motor. The stable motor rotation described above in turn keeps the tape tension constant. Details will be described in the following embodiment.

Referring to FIG. 10, tape tension T is given by the following equation when the take-up reel torque is defined as T0 and the overall radius of the tape on the take-up reel as r:

$$T = T0/r \tag{1}$$

If the tape speed is determined as 4.8 cm/sec, the rotational frequency n of the reel is given by $$n = 2\pi r/4.8 \approx 1.31r \, [RPS] \quad (2)$$

If the reduction ratio δ of the reel to the reel motor is defined as 3.5, the rotational frequency N of the motor is given by $$N = 3.5n \approx 4.6r \, [RPS] \quad (3)$$

Further, the reel torque T0 is 3.5 times the motor torque M0, that is, $$T0 = 3.5M0 \quad (4)$$

When equations (3) and (4) are substituted into equation (1), the following equation is obtained.

$$T = \frac{T0}{r} = \frac{T0}{N/4.6} = \frac{4.6}{N} \times 3.5M0 = 16.1 \times \frac{M0}{N}$$

In order to express the tape tension T as a constant, the above equation is written in the following form:

$$\frac{T}{16.1} = \frac{M0}{N} = \text{constant} \quad (5)$$

In this way, the rotational frequency and torque of the reel motor should be controlled in a proportional manner.

Changes in rotational frequency of the reel motor must be detected as changes in the frequency of the motor noise as described above. These detected changes must then be converted to changes in voltage, which are in turn fed back to the motor driving circuit. Therefore, the torque characteristics are given corresponding to the rotational frequency of the reel motor, thus accomplishing reel motor control in which the tension servo circuit provides a constant tape tension.

Figure 11:
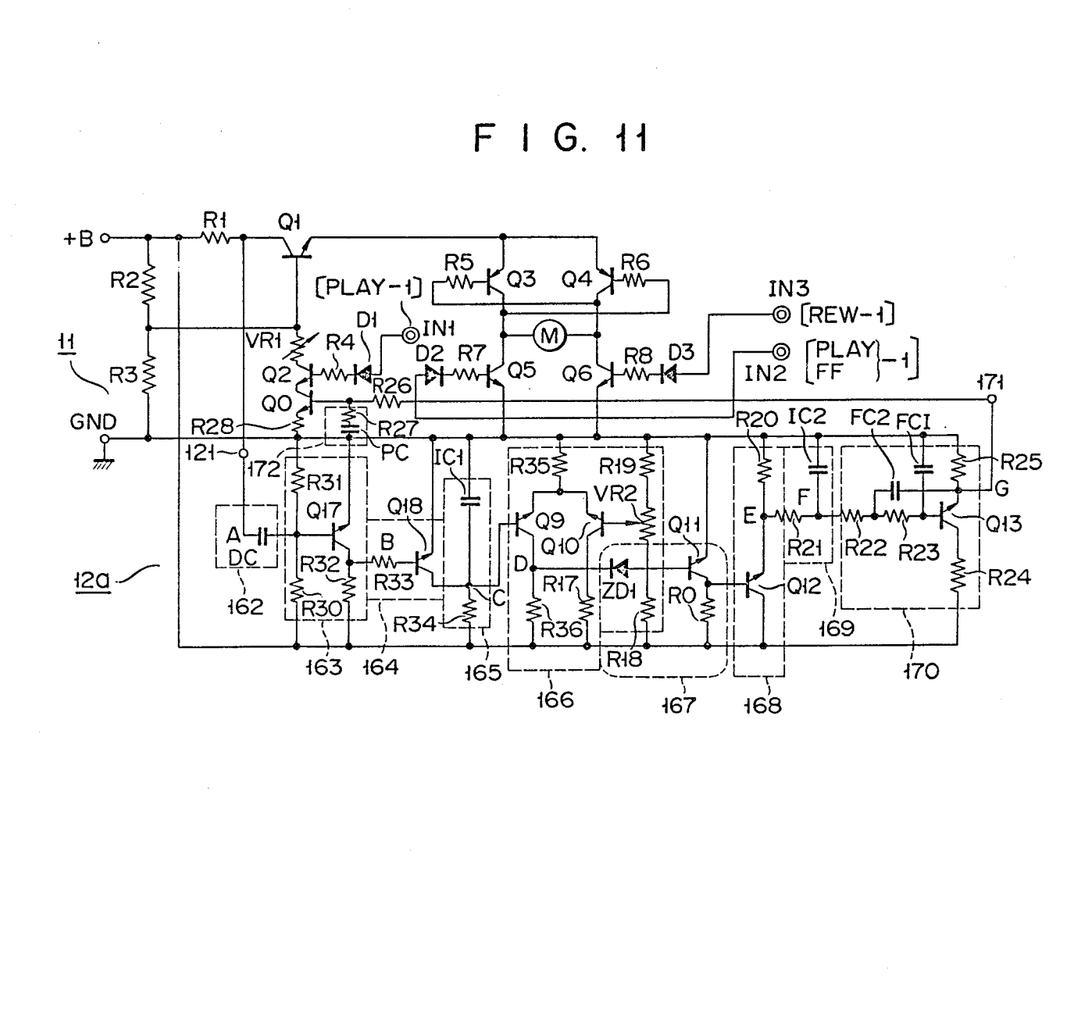
FIG. 11 is a circuit diagram of another embodiment according to the present invention.
Figure 12A:
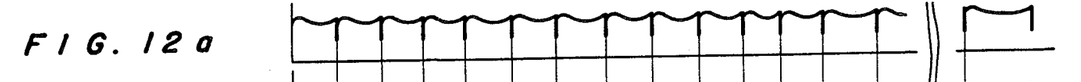
Figure 12B:
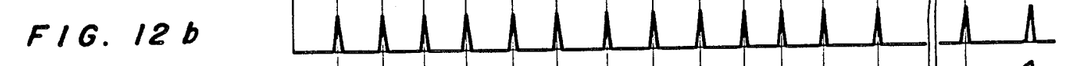
Figure 12C:
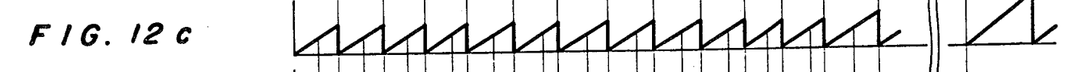
Figure 12D:
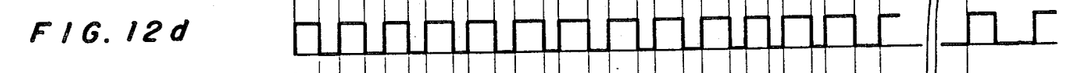
Figure 12E:
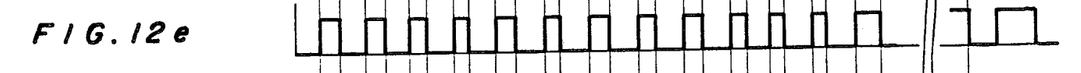
Figure 12F:
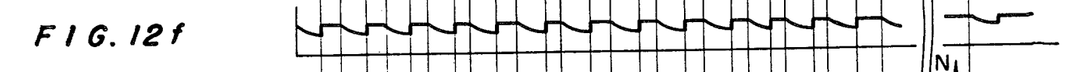
Figure 12G:
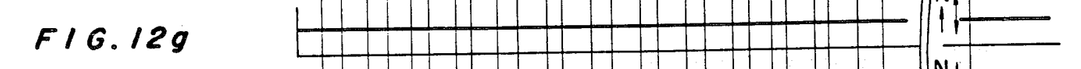
Figure 12H:
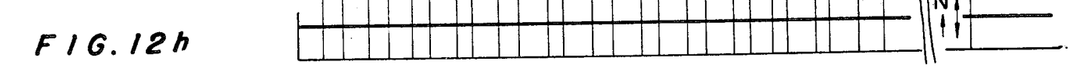

Another embodiment of the present invention based on the principle described above will be described in detail with reference to FIG. 11. The same reference numerals in FIG. 11 denote the same parts as in FIG. 3. Referring to FIG. 11, reference numeral 11 is the reel motor driving circuit section. Power source +B is connected to the collector of the transistor Q1 through the resistor R1 and is grounded further through the series-connected resistors R2 and R3. The base of the transistor Q1 is connected to a node of the series-connected resistors R2 and R3, and to the collector of the transistor Q2 through the variable resistor VR1. The emitter of the transistor Q1 is connected to the common emitter of the transistors Q3 and Q4. The base of the transistor Q2 is connected to the playback input terminal IN1 through series-connected resistor R4 and diode D1. The emitter of the transistor Q2 is grounded through a transistor Q0 to be described later. The base of the transistor Q3 is connected through the resistor R5, together with the collector of the transistor Q4, to the collector of the transistor Q6. Similarly, the base of the transistor Q4 is connected through the resistor R6, together with the collector of the transistor Q3, to the collector of the transistor Q5. The bases of the transistors Q5 and Q6 are respectively connected to the playback/fast forwarding input terminal IN2 and the rewinding input terminal IN3 through the series-connected resistor R7 and diode D2, and the series-connected resistor R8 and diode D3, respectively. The emitters of the transistors Q5 and A6 are respectively grounded. The DC motor with brushes M is connected between the collectors of the transistors Q5 and Q6.

The resistor R1 is used for setting a motor torque in fast forwarding and rewinding modes, while the resistor R2 and the variable resistor VR1 are used for setting the motor torque in playback. The resistors R1 and R2, and the variable resistor VR1 are utilized for setting the motor driving voltage in the playback, fast forwarding and rewinding modes. Further, the resistors R2 and R3 are used for setting the time for the fast forwarding and rewinding.

The motor shaft MS of the DC motor with brushes for driving the reels, for example as shown in FIG. 1 as described above, engages with the idler I which is selectively engaged or disengaged with the supply reel SR or the take-up reel TR. The arrangement of the motor shaft MS, the idler I and the respective reels may be such that they are coupled with gears and the idler I is selectively engaged with the supply reel SR or the take-up reel TR corresponding to the rotational direction of the motor shaft MS. Alternatively, the idler I may be switched over to one of the reels by the solenoid plunger or the like ganged with the corresponding operation key.

In this case, since the reels are driven by a reel motor for this purpose without using a slip mechanism such as a clutch, the reliability of the tape driving mechanism is increased, and the manufacturing cost is accordingly reduced.

The cassette tape recorder of this type differs from the tape recorder having a simple mechanical operation section, in that it has the logic (electronic) control section. Therefore, according to the logic circuits which correspond to the respective operation keys, for example, an operation signal of high level is selectively supplied to the input terminals IN1 to IN3 when the operation key is operated, while an operation signal of low level is selectively supplied to the input terminals IN1 to IN3 when the operation key is not operated.

An operation signal of high level is supplied to the input terminals IN1 and IN2 in the playback mode, so that the transistors Q2 and Q5 (the transistor Q0 is constantly on unless otherwise indicated hereinafter) are turned on. The transistor Q1 is then weakly biased and the transistor Q4 is turned on. The power source (+B) voltage is supplied as a small voltage output to the motor M through the resistor R1 since a voltage route of Q1 and Q4, motor M, Q5 and ground is established. The motor M makes the take-up reel travel in the forward direction, thus accomplishing constant speed playback.

For fast forwarding, an operation signal of high level is supplied only to the input terminal IN2, so that the transistor Q2 is turned off and the transistor Q5 is turned on. The transistor Q1 is then strongly biased and the transistor Q4 is turned on, so that a large voltage output is supplied to the motor along the voltage route described above. The motor M makes the take-up reel travel at high speed in the forward direction, thus accomplishing fast forwarding.

For rewinding, an operation signal of high level is supplied to only the input terminal IN3, so that the transistor Q2 is turned off and the transistor Q6 is turned on. The transistor Q1 is then strongly biased and the transistor Q3 is turned on, so that along a voltage route of Q1 and Q3, motor M, Q6 and ground, a large voltage output is supplied to the motor M. The motor makes the supply reel travel at high speed in the reverse direction, thus achieving rewinding.

As is apparent from the above description, the resistor R1 determines the amount of current supplied to the motor M, that is, the torque of the motor M (especially for fast forwarding and rewinding). Since the current waveform of the motor M in rotation includes the pulse signal components described above, the pulse signal components may be regarded as the voltage drop across the resistor R1.

According to this embodiment, in order to detect the pulse signal components in the current waveform, based on the voltage change across the resistor R1, the node of the resistor R1 and the collector of the transistor Q1 is connected to the input terminal 121 of the rotation control circuit section 12a.

The input terminal 121 is connected to the base of a transistor Q17 which constitutes part of the amplifier 163 through the differential capacitor DC which constitutes part of the differentiator 162. The base of the transistor Q17 is connected to the power source +B through a resistor R30 and is grounded through a resistor R31. The emitter of the transistor Q17 is grounded. The collector of the transistor Q17 is connected through a resistor R33 to the power source +B through a resistor R32 and to a base of a transistor Q18 which constitutes part of a switching section 164.

The emitter of the transistor Q18 is directly grounded, while the collector thereof is connected to a node of a resistor R34 and a capacitor IC1 connected in series to form the integration circuit 165 and to the base of a transistor Q9 constituting the comparator 166.

The transistor Q9 is connected to a transistor Q10 to form a differential circuit, and the emitters thereof are commonly connected through a resistor R35 to ground. The collectors of the transistors are connected to the power source +B through resistors R36 and R17, respectively. The base of the transistor Q10 is connected to the movable terminal of the variable resistor VR2 of a series circuit consisting of a resistor R18, the variable resistor VR2 and a resistor R19, connected between the power source +B and ground.

The collector of the transistor Q9 is connected to the base of a transistor Q11 through a Zener diode ZD1 having a polarity as shown in the figure and constituting part of the level shift circuit 167. The emitter of the transistor Q11 is directly grounded, and the collector thereof is connected to the power source +B through a resistor R0 and to the base of a transistor Q12 which constitutes part of the buffer circuit 168. The collector of the transistor Q12 is directly connected to the power source +B, and the emitter thereof is grounded through a resistor R20 and is also grounded through a series circuit of a resistor R21 and a capacitor IC2 which constitute an integration circuit 169.

A node F of the resistor R21 and the capacitor IC2 is connected to the base of a transistor Q13 constituting part of a filter circuit 170 through series-connected resistors R22 and R23. The base of the transistor Q13 is grounded through a capacitor FC1, and the collector thereof is connected to the power source +B through a resistor R24. The emitter of the transistor Q13 is connected to a node of the series-connected resistors R22 and R23 through a capacitor FC2 and is grounded through a resistor R25.

The emitter of the transistor Q13 is connected to the base of the control transistor Q0 of the reel motor driving circuit section 11 through an output terminal 171 and a resistor R26 of the reel motor rotation control circuit section 12a. The base of the control transfer Q0 is grounded through a series-connected resistor R27 and capacitor PC which constitutes. a phase compensating circuit 172. The emitter of the transistor Q0 is grounded through a resistor R28 and the collector thereof is connected to the emitter of the transistor Q2.

The rotation control circuit section 12a differentiates at the differentiator 162 the motor noise component shown in (a) of FIG. 12 which appears at the resistor R1 of the reel motor driving circuit section 11 described before. The differentiated output is amplified at the amplifier 163. Thus, the differentially amplified output shown in (b) of FIG. 12 is obtained. On the right of FIG. 12 the waveforms at a low rotational frequency of the motor M are shown. The differentially amplified output passes through the switching unit 164 and the integration circuit 165 to form an output having a saw-toothed waveform, as shown in (c) of FIG. 12. This saw-toothed waveform is converted to a rectangular waveform at the comparator 166, as shown in FIG. 12(d). The rectangular waveform is converted to the rectangular waveform as shown in FIG. 12(e) through the level shift circuit 167 and the buffer circuit 168. The rectangular waveform is again converted to a saw-toothed waveform as shown in (f) of FIG. 12 at the integration circuit 169. The output of the saw-toothed waveform is filtered with a filter characteristic of −12 dB/oct at the filter circuit 170 to produce a DC current of constant level as shown in FIG. 12(g).

This DC current may be detected because changes in frequency of commutator noise corresponding to changes in rotational frequency of the reel motor are detected as changes in the voltage level. If this DC current is supplied to the control transistor Q0 of the reel motor driving circuit 11 through the phase compensating circuit 172, control can be accomplished such that the torque in proportion to the rotational frequency of the reel motor M is constant, that is, the tension servo circuit controls the reel motor to have a constant tape tension.

According to the embodiment of the present invention as described in detail above, by utilizing the DC motor with brushes for driving reels, the output which detects the period of the pulse signal component in the current waveform of the DC motor with brushes for driving reels, corresponding to the rotational frequency of the motor, is fed back to the motor driving circuit section, thus providing the tension servo circuit which controls the rotation of the motor effectively, easily and with a simple construction.

What we claim is:

1. A rotation control device for a DC motor with brushes, comprising:
 a motor driving circuit including means for receiving DC power and providing driving signals to said DC motor said driving circuit including switching means for ON/OFF control of the driving signals to the DC motor;
 detecting means, coupled to said motor driving circuit, for providing a commutation pulse signal component of current flowing through said motor driving circuit to said motor;
 means for generating, in response to said commutation pulse signal component, a reference pulse signal having a period longer than the normal period of the commutation pulse signal component;

a gate circuit for gating the commutation pulse signal component from said detecting means, said gate circuit being gated in response to said reference pulse signal so as to be open during the period of the reference pulse signal; and means, coupled to an output of said gate circuit, for generating a control signal for rendering said switching means of said motor driving circuit OFF, to stop rotation of said motor when no commutation pulse signal component passes through said gate circuit.

2. A rotation control device according to claim 1, wherein said control signal has a level corresponding to a pulse rate of the commutation pulse signal component.

3. A rotation control device according to claim 2, wherein said control signal generating means comprises a switching circuit which is closed when the level of the control signal falls to zero, and a logic circuit, coupled to an output of said switching circuit for generating said control signal.

* * * * *